Feb. 27, 1940. H. H. BLAU 2,191,951
METHOD FOR FORMING SEALED HOLLOW ARTICLES OF GLASS
Filed Sept. 8, 1937 2 Sheets-Sheet 1
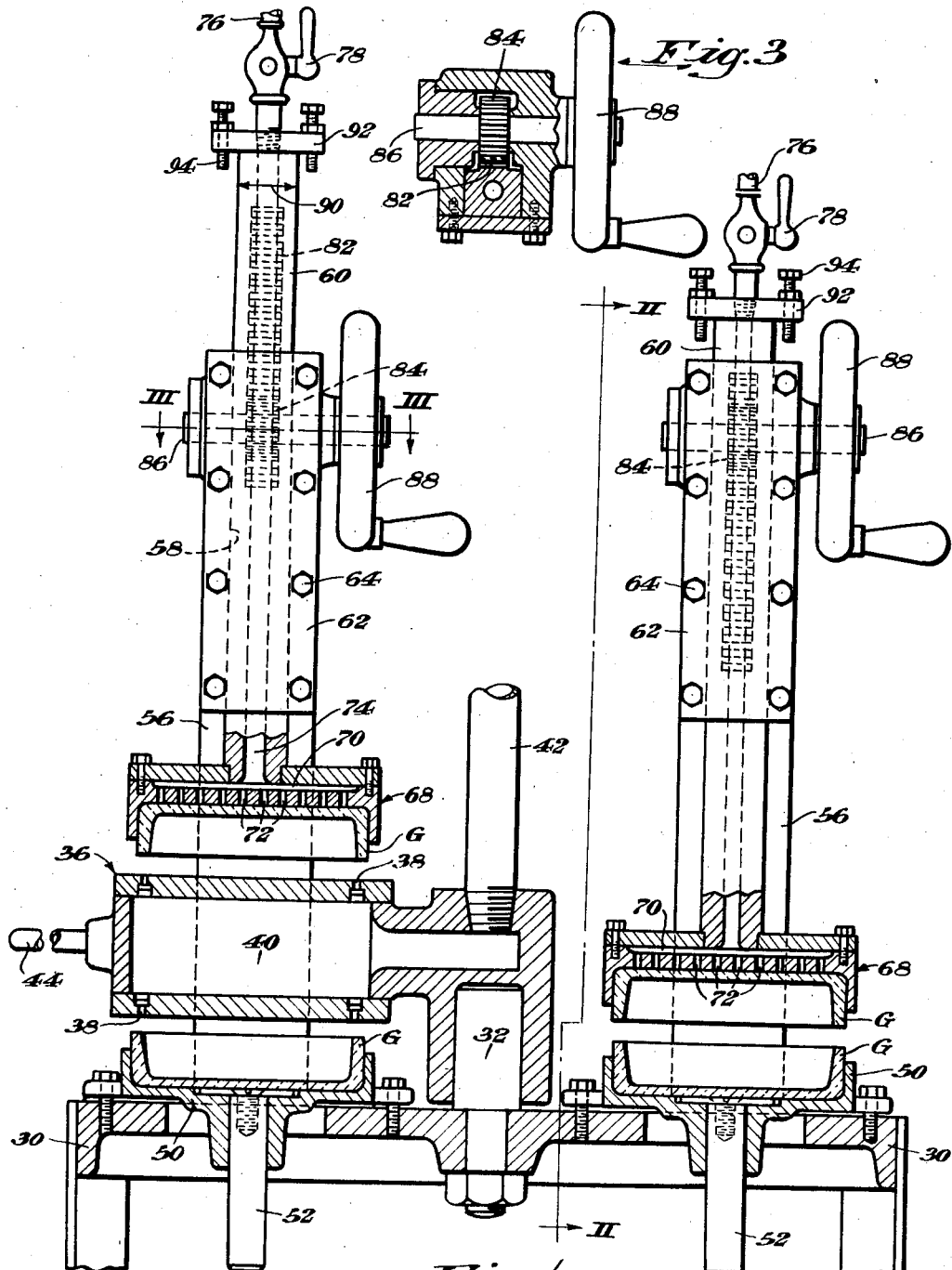
INVENTOR.
Henry H. Blau
BY Brown, Critchlow & Hick
his ATTORNEYS.

Feb. 27, 1940. H. H. BLAU 2,191,951
METHOD FOR FORMING SEALED HOLLOW ARTICLES OF GLASS
Filed Sept. 8, 1937 2 Sheets-Sheet 2
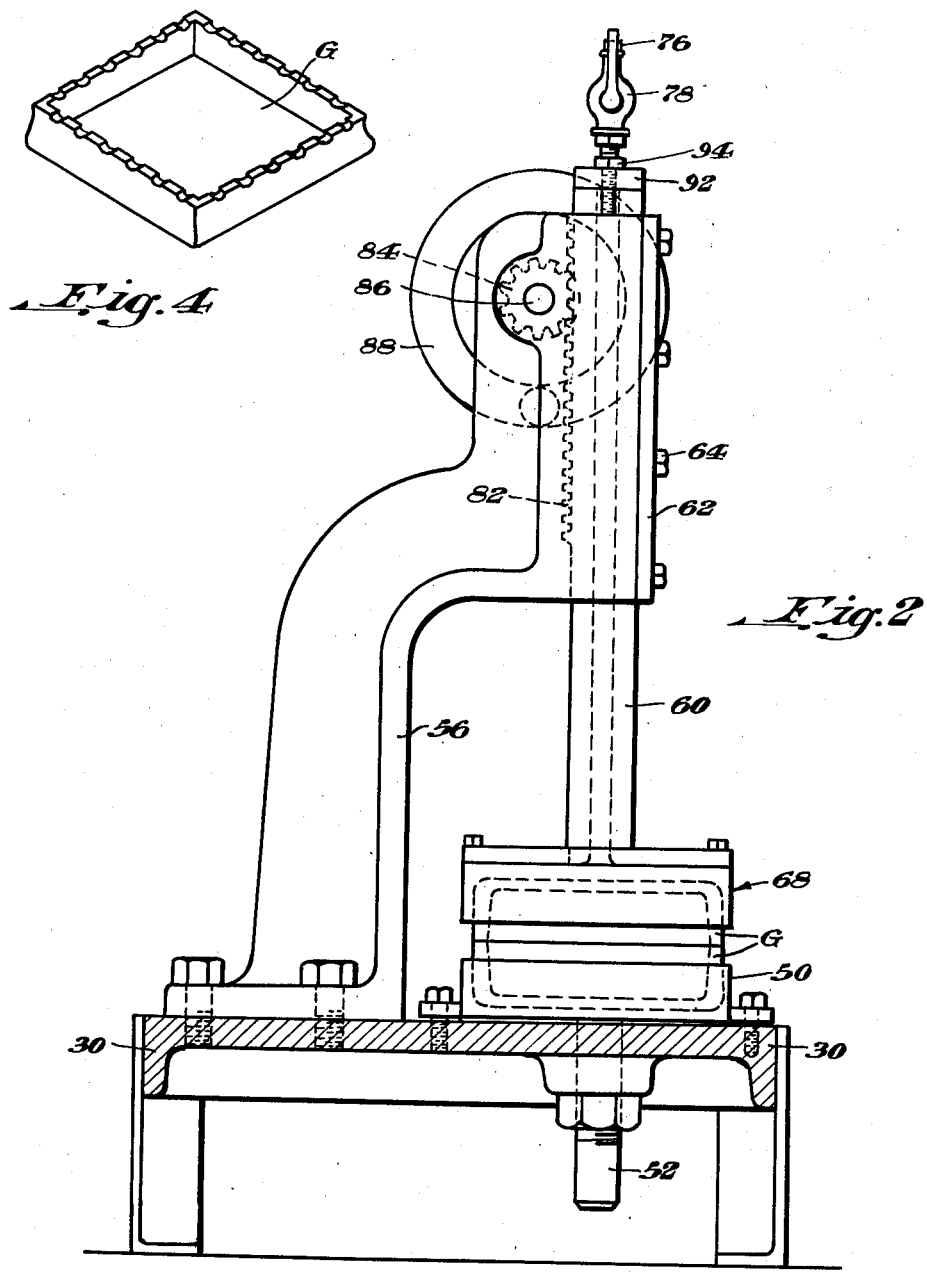
WITNESSES:
E. J. Maloney.
A H Oedham
INVENTOR.
Henry H. Blau
BY Brown, Critchlow + Flick
his ATTORNEYS.

Patented Feb. 27, 1940

2,191,951

UNITED STATES PATENT OFFICE 2,191,951

METHOD FOR FORMING SEALED HOLLOW ARTICLES OF GLASS

Henry H. Blau, Charleroi, Pa., assignor to Corning Glass Works, Corning, N. Y., a corporation of New York Application September 8, 1937, Serial No. 162,902

5 Claims. (Cl. 49—82)

This invention relates to methods for making sealed hollow bodies of glass, as for example, hollow building blocks which now are being used in increased numbers for partitions, walls, ceilings and the like, and more particularly is concerned with commercially practical methods for producing sealed hollow glass bodies having a desired internal pressure.

Heretofore sealed hollow bodies or articles of glass, such as building blocks, usually have been made by press forming complemental parts generally in the form of halves having peripheral flanges bounding relatively flat portions. The edges of the flanges of the press-formed parts have been heated to soften them and the parts have been pressed together to form a hollow body. While this procedure is generally satisfactory, I have found that it is difficult to obtain hollow glass bodies with desired internal pressures which is of considerable importance. If the internal pressures are too low or too high, the bodies are weak structurally. I have found, moreover, that in making glass bodies by the known process above described when the parts are fused together to form a sealed hollow article the gases entrapped between the halves are ordinarily not at the temperature of the glass parts so that once the gases have reached the glass temperature there is a considerable pressure inside the article which is often sufficient to cause a blowout of a weak or more fluid portion of the zone or line of joinder of the parts.

It is the general object of my invention to avoid and overcome the foregoing and other objections by the provision of improved methods and apparatus particularly adapted to rapidly and efficiently manufacture in commercial production sealed hollow glass articles having a desired internal pressure under normal conditions of use.

Another object of my invention is the provision of a novel method including the step of entrapping a desired amount of gas between the glass parts when joined together to form a sealed hollow body.

Another object of my invention is the provision of relatively inexpensive substantially automatic apparatus for producing hollow glass bodies having a desired internal pressure.

Another object of my invention is to provide a method for making sealed hollow articles of glass in which complemental parts are joined together by fusion with certain of the parts being vented to allow the escape of a desired amount of air or gases from the interior of the article.

The foregoing and other objects of my invention are achieved by the provision of a method for making sealed hollow articles of glass from preformed parts, which method comprises holding the parts in alignment but spaced apart, simultaneously heating the portions of the parts to be engaged to soften them, bringing the parts almost together and so that the heated portions are in opposed and closely spaced relation to each other, and holding the parts in the stated relation for a predetermined dwell to allow a desired amount of the hot gases to escape from between the glass parts. After the dwell, the softened portions of the parts are pressed together in fused relation to form a sealed hollow body. Instead of achieving the seal between the complementary parts by fusion of glass to glass, I may seal two hot preformed glass parts together by dipping the portions to be engaged in molten metal, such as solder or aluminum, or by the use of other cements. The parts are thereafter brought together in fused relation after a predetermined dwell so that the pressure in the interior of the hollow article is as desired.

Apparatus constructed in accordance with my invention includes means for supporting preformed glass parts having portions to be engaged in spaced-apart relation, means for heating the portions to soften them, and means for bringing the parts into closely associated but spaced relation to each other and for holding the parts there for a predetermined dwell. For completing the combination means are provided for pressing the softened portions of the parts together in fused relation to form a sealed hollow article and for holding the parts in such relation until fusion takes place.

In the accompanying drawings Fig. 1 is a vertical cross-sectional view of one embodiment of apparatus incorporating the principles of and for practicing my invention; Fig. 2 is a vertical cross-sectional view taken on line II—II of Fig. 1; Fig. 3 is a horizontal cross-sectional view taken on line III—III of Fig. 1; and Fig. 4 is a perspective view of a glass part preformed to shape and adapted to be joined with a similar part to form a hollow block.

Although the principles of my invention can be employed in the manufacture of various kinds of sealed hollow articles and bodies of glass, the principles are particularly beneficial in making hollow glass building blocks and hence the invention has been so illustrated and will be so described. However, it should be expressly understood that my invention is not limited to the specific example thereof described. Again, while the method of my invention can be performed by various apparatus as, for example, simple hand tools or an automatic turret-type apparatus, I have illustrated one type of apparatus for performing the method of my invention which will now be described.

Having particular reference to Fig. 1, the numeral 30 indicates generally a table having a central stud 32 which rotatably carries for movement in a horizontal plane a burner, indicated as a whole by the numeral 36. The burner 36 is usually of the type adapted to burn a mixture of air and a combustible gas and is provided with a plurality of ports 38 at its upper and lower surfaces which ports extend to a chamber 40 provided in the interior of the burner and to which a conduit 42 is connected for supplying the fuel to the burner. An operating handle 44 on the burner permits the burner to be swung about the stud 32 and to a plurality of working stations.

Ordinarily the working stations are two in number, as illustrated, and each includes a chuck or holding member 50 mounted on the table 30 and adapted to releasably receive a glass part G to be joined to a similar or complemental part in the formation of the hollow glass article. A kick-out plunger 52 is ordinarily provided in the holding member 50 for removing the glass part G, as hereinafter described. In the embodiment of the invention illustrated each glass part G is formed with a substantially flat portion bounded by an upstanding endless flange which, as shown in the drawings, is positioned by the holding member 50 so that the flange is in closely spaced relation to the ports 38 in the bottom of the burner 36.

Each working station likewise includes an upright 56 secured to the table and provided with a vertically extending groove 58 which slidably receives a plunger 60. A cover plate 62 secured to the upright 56, as by cap screws 64, hold the plunger 60 in the groove 58 for vertical reciprocating movement therein.

Secured to the lower end of the plunger 60 is an upper chuck or holding member, indicated generally at 68, which may include mechanical means for releasably gripping a glass part G similar to or complemental with the glass part G received by the holding member 50. The holding member 68 has, however, been illustrated as of the suction cup type including a manifold opening 70 connected to the face of the holding member by a plurality of openings 72. The manifold opening 70 is in communication with a passageway 74 formed in the plunger 60, which passageway is connected to a suction conduit 76 by way of a valve 78 so that operation of the valve releases or clamps a glass part G in the holding member 68 so that the flange of the glass part is in alignment with the ports 38 in the top of the burner 36.

The vertical position of the plunger 60 may be controlled as desired but in the example of my invention illustrated this is achieved by providing a rack 82 on the back of the plunger 60, which rack is engaged by a pinion 84 secured to a shaft 86 journaled in the upright and carrying an operating hand wheel 88 at its end.

The plunger 60 is provided with means for indicating when it is in the proper vertical position to hold the heated glass parts G in closely spaced relation so as to permit the escape of hot gases from between the glass parts, as hereinafter described in greater detail, and such means may comprise a line or mark 90 formed on the upper end of the plunger 60 which registers with the top of the upright 56 when the glass parts are in the so-called "dwell" position. Likewise the plunger 60 is ordinarily provided with means for limiting its downward movement which controls the amount to which the glass parts are pressed or sealed together. To this end a crosshead 92 is secured to the end of the plunger 60 and is provided with adjustable cap screws 94 which engage with the upper end of the upright 56 to limit the downward movement of the plunger.

In the operation of the apparatus just described and in the practice of my improved method, a complemental pair of glass parts G is inserted in one pair of holding members 50 and 68. The glass part G received in the lower holding member 50 is held in position by gravity while the glass part G received in the upper holding member 68 is held in position by suction when the valve 78 is turned to the open position. With the plunger 60 in its uppermost position the burner 36 is swung about the stud 32 to position the ports 38 of the burner opposite the flanges of the glass parts G which are to be fused together. The burner heats the portions of the glass parts to be engaged to soften them and bring them to fusing temperature, and the burner is then swung about the stud 32 and in between a second pair of complemental glass parts carried by the second station. The glass parts which have just been heated at the first station are then brought into closely spaced relation with each other by moving the holding member 68 and the plunger 60 downwardly through operation of hand wheel 88 until the mark 90 comes to the top of the upright 56. This position of the parts is illustrated on the right hand side of Fig. 1 whereas the heating of the glass parts is shown at the left hand side of Fig. 1.

After the glass parts have been retained for a predetermined time in the position illustrated in the right hand side of Fig. 1 and so that a desired amount of gas has escaped from between the glass parts, the operating wheel 88 is turned to lower the uppermost glass part into engagement with the lower glass part, which movement is limited by the engagement of the cap screws 94 with the upper end of the upright 56. The glass parts are held in pressed-together sealed relation until the softened contacting portions thereof have fused integrally with each other, and the glass at the line of joinder has set.

After the glass parts have been joined together as just described, the valve 78 is turned to closed position which releases the uppermost glass part from the holding member 68 so that by lifting the kick-out member 52 the completed glass block can be removed from the lower holding member 50 and placed in the finishing lehr. It will be understood that as one set of glass parts is being heated at one station, a second pair of glass parts at the second station is being brought together with the predetermined dwell and pressing operation as just described, and that after a complete block has been formed and removed from the apparatus still another pair of complemental glass parts is placed in the holding members from which the completed block has just been removed so that the operation can be performed continuously.

The dwell of the glass parts in closely spaced relation comprises an important feature of my invention inasmuch as by controlling the time of dwell I am able to control the internal pressure in the completed block or other article within limits so as to provide the strongest type of block from a given weight of material while retaining the advantages of insulating characteristics of the block. I am also able to largely eliminate blowout of the zone of joinder of the blocks as often occurred in prior practices. Generally speaking, the longer the time of dwell the greater is the vacuum in the finished block. This is due to the fact that the gases trapped between the glass parts are initially relatively cool. However, since the glass parts are comparatively hot, having usually just been transferred from the pressing apparatus with their flanges thereafter being highly heated, there is a temperature differential between the entrapped gass and the glass parts resulting in a relatively rapid heating of such gas. As the trapped gas gets hotter it expands and escapes between the spaced flanges of the glass parts prior to fusing them tightly together. Usually in manufacturing blocks 8" x 8" x 4", approximately one to three seconds' dwell of the parts is employed to obtain the desired internal pressure in the block. Needless to say the temperature of the glass parts, the temperature of the gas entrapped between the parts, the mass of the gas, and the mass of the glass are all factors in determining the time of dwell. By controlling the time of dwell I am able to provide uniform blocks or other articles having an internal pressure of within approximately one pound of that set as a standard.

In addition to providing a dwell of the glass parts when in closely spaced relation and before fusing I may provide venting means in the blocks which effect substantially the same result. I have specifically illustrated in Fig. 4 of the drawings a glass part G formed with vent openings, such as notches 54, in its flanges, which notches, in the joining of the glass parts together, function to vent out gases trapped between the glass parts. While a plurality of notches 54 have been shown in Fig. 4, it should be appreciated that one or more notches in the form of half round, half square, undulating or like recesses, serrations or raised portions, can be formed on the edges of the flanges to achieve a venting effect. Such serrations if formed continuously over the entire edge of the flange increase the exposed surface area of the flange so that the flange may be more quickly and more highly heated and minimizes the localizing of the cooling action of the egress of relatively cold gases from within the block.

I may shape the flanges of the glass parts so that obstructions to sealing in the form of raised portions are first offered or first engage at the points where the heaviest sections of the seal should be formed. This may be at the corners. The result is a proper venting action and a resulting seal of proper mechanical construction, i. e., with the weight of glass where it is of greatest mechanical and thermal value.

If the notches are used the soft plastic edges of the flanges are brought into contact with each other with the notches open to permit a desired amount of the hot internal gases to escape through them. After a suitable dwell for this purpose, the parts are pressed firmly together to seal the notches.

It should be understood that instead of providing a definite period of dwell during which the glass parts are stationary relative to each other in closely spaced relation that I may achieve the same result by bringing the glass parts into closely spaced relation and then slowly moving the parts into sealing relation with each other. The word "dwell" as employed in the claims is intended to cover both the stationary dwell and the slow moving dwell unless otherwise particularly stated.

From the foregoing it will be recognized that the objects of my invention have been achieved by the provision of improved methods and apparatus for manufacturing hollow bodies of glass in which internal pressures of desired magnitude are obtained. The methods and apparatus adapt themselves to commercial production operations and are easily operated and performed.

While in accordance with the patent statutes one embodiment of the apparatus of my invention and one manner of practicing the method of my invention have been illustrated and described in detail, it should be appreciated that the invention is not limited thereto or thereby, but is defined in the appended claims.

I claim:
1. The method of making sealed hollow bodies of glass from preformed complemental parts which comprises holding the parts so that the portions of the parts to be engaged are in alignment but spaced apart, simultaneously heating the portions to be engaged to soften them, moving the parts in a straight line toward each other until almost together and so that the heated portions are in opposed and closely spaced relation to each other, holding the parts in the stated relation for a predetermined dwell to allow a desired amount of the hot gases to escape from between the glass parts, and then continuing the straight-line movement of the parts toward each other to press the softened portions of the parts together in fused relation to form a hollow body.

2. The method of making hollow blocks of glass from press-formed complemental parts which comprises holding the parts so that they can be moved directly together without stopping the parts to change the direction of movement, simultaneously heating the portions of the parts to be engaged to soften them, thereafter moving the parts toward each other with a continuous movement which would effect a joining operation but deliberately stopping the joining movement when the parts are almost together and so that the heated portions to be engaged are in opposed and closely spaced relation to each other, holding the parts in substantially the stated relation for a predetermined dwell to allow a desired amount of the hot gases to escape from between the glass parts, and thereafter continuing the direct joining movement of the parts to press the softened portions of the parts together in fused relation to form a sealed hollow block having a desired amount of gas trapped therein.

3. The method of making a closed hollow building block from a pair of flanged halves thereof formed by pressing molten glass, comprising heating the edges of the flanges of both halves to a fusion temperature while the glass remains hot from its forming operation, moving the halves almost together and with their flanges sufficiently close together so that further movement together will not trap any additional cool gas between the halves, holding the halves with their flange edges in said closely spaced proximity to each other for at least one full second while gas within and heated by the halves thermally expands and flows outwardly between the flange edges, thereafter bringing the flange edges of the halves together, and pressing the halves towards each other integrally to fuse said edges together.

4. The method of making a closed hollow building block from a pair of flanged halves thereof formed by pressing molten glass, comprising preparing the edges of the flanges while the glass remains hot from its forming operation so that they are adapted to be joined together, moving the halves almost together and with their flanges sufficiently close together so that further movement together will not trap any additional cool gas between the halves, holding the halves with their flange edges in said closely spaced proximity to each other for at least one full second while gas within and heated by the halves thermally expands and flows outwardly between the flange edges, thereafter bringing the flange edges of the halves together, and pressing the halves towards each other to join said edges together.

5. The method of making a closed hollow building block from a pair of flanged halves thereof formed by pressing molten glass, comprising heating the edges of the flanges of both halves to a fusion temperature while the glass remains hot from its forming operation, bringing the halves towards each other with a movement which if continued would effect a joining operation but stopping this movement when the flanges are almost joined together and are in closely spaced proximity, holding the halves for not less than one second with their flange edges in the stated proximity to each other while gas within and heated by the halves thermally expands and flows outwardly between the flange edges, and thereafter continuing the joining movement to bring the flange edges of the halves together and pressing the halves towards each other integrally to fuse said edges together.

HENRY H. BLAU.